US012717428B2

(12) United States Patent
Tanaka et al.

(10) Patent No.: US 12,717,428 B2
(45) Date of Patent: Aug. 25, 2026

(54) ELECTRONIC PEN

(71) Applicant: Wacom Co., Ltd., Saitama (JP)

(72) Inventors: Kohei Tanaka, Saitama (JP); Takenori Kaneda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/178,599

(22) Filed: Apr. 14, 2025

(65) Prior Publication Data

US 2025/0278147 A1 Sep. 4, 2025

Related U.S. Application Data

(63) Continuation of application No. PCT/JP2023/033156, filed on Sep. 12, 2023.

(30) Foreign Application Priority Data

Oct. 14, 2022 (JP) ................................ 2022-165668

(51) Int. Cl.
*G06F 3/0354* (2013.01)

(52) U.S. Cl.
CPC ................................ *G06F 3/03545* (2013.01)

(58) Field of Classification Search
CPC ....... G06F 3/03545; G06F 3/03; G06F 3/0383
See application file for complete search history.

(56) References Cited

U.S. PATENT DOCUMENTS 10,754,448 B2 * 8/2020 Chiu ..................... G06F 1/1643
2013/0321353 A1 * 12/2013 Chikami ............. G06F 3/03545 345/179
2017/0102792 A1 * 4/2017 Aoki ................... G06F 3/03545
2024/0152220 A1 * 5/2024 Kaneda .............. G06F 3/03545

FOREIGN PATENT DOCUMENTS

JP 2019185653 A 10/2019

OTHER PUBLICATIONS

International Search Report, mailed Nov. 14, 2023, for International Patent Application No. PCT/JP2023/033156. (5 pages) (with English translation).

* cited by examiner

*Primary Examiner* — Mihir K Rayan
(74) *Attorney, Agent, or Firm* — Seed Intellectual Property Law Group LLP

(57) ABSTRACT

Provided is an electronic pen including a casing that has an opening portion at a front end, has a ring-shaped protruding portion protruding toward an axis from an inner wall surface in a vicinity of the opening portion, and is mounted with a circuit part, a core body including a pen tip portion and a shaft portion extending from a rear end surface of the pen tip portion, and a ring-shaped elastic member so provided as to be penetrated by the shaft portion in a part in which a front end surface of the protruding portion of the casing and the rear end surface of the pen tip portion of the core body are opposed to each other, the ring-shaped elastic member having an inclined side surface by having a small opening on a pen tip side and having a large opening on a rear end side.

8 Claims, 5 Drawing Sheets

ELECTRONIC PEN

BACKGROUND

Technical Field

The present disclosure relates to an electronic pen used as a position indicator for a position detecting device mounted in an information processing device such as a tablet personal computer (PC), for example.

Description of the Related Art

As a core body of an electronic pen, there is one formed by hard resin such as polyacetal (POM) as well as a core that is formed by bundling synthetic fibers and to which elasticity is imparted by voids being provided between the synthetic fibers in an axial direction. In addition, there are also cores that are formed by synthetic resin such as plastic and are provided with elasticity by pores of various shapes being provided in the axial direction. A core body provided with elasticity as described above can provide a soft touch when coming into contact with a protective material such as resin or glass on the position detecting surface of a position detecting sensor, and can prevent the electronic pen (core body) from slipping on the protective material.

In recent years, tablet PCs using an electronic pen have been put to use in a learning system targeted at pupils and students. It has hitherto been the case that pupils in the lower grades of elementary school may exhibit a habitual behavior of "biting a pen," "mouthing a pen," or "licking a pen." This "habitual" behavior has also been seen at times of usage of an electronic pen. The pupils may bite, mouth, or lick the electronic pen. It is considered that, when a side of the electronic pen from which the core body protrudes is bitten, mouthed, or licked, saliva may permeate the inside of the pen from an opening part of the electronic pen from which the core body protrudes. Since an electronic circuit and the like are arranged inside the electronic pen, infiltration of water may cause the electronic circuit and the like to cease to operate normally, or cause a failure therein.

In particular, in a case of a core body formed by synthetic fibers being bundled and provided with voids in the axial direction or a core body formed by synthetic resin and provided with pores in the axial direction, as described above, saliva easily enters a main body of the electronic pen through the voids or the pores due to capillarity. Accordingly, Japanese Patent Laid-open No. 2019-185653 discloses an disclosure of a core for an electronic pen in which a core body formed by synthetic fibers being bundled and provided with voids in the axial direction or a core body formed by a synthetic resin and provided with pores in the axial direction is impregnated with a bitter component. This allows a bitter taste to be felt when biting, licking, or mouthing is performed, so that these behaviors can be expected to be prevented.

When a bitter taste is felt at a time of biting, mouthing, or licking the electronic pen, the bitter tase can cause the "habitual" behaviors to gradually be stopped. The disclosure disclosed in Japanese Patent Laid-open No. 2019-185653 is therefore a useful technology from a viewpoint of protecting the electronic pen. However, the behavior of biting, mouthing, or licking the electronic pen is a "habit" as described above, and one-time experience of feeling a bitter taste is less likely to result in immediate elimination of the behavior. Therefore, even when a bitter taste is felt, the "habitual" behavior of biting, mouthing, or licking the electronic pen is continued for a certain period of time. In the meantime, saliva may enter the inside of the electronic pen from a gap between the core body and a casing at a front end part of the electronic pen.

In addition, as the core body of the electronic pen, there is not only a core body formed by synthetic fibers being bundled and provided with voids in the axial direction and a core body formed by a synthetic resin and provided with pores in the axial direction but also one formed by hard resin such as POM or another material. Also in this case, when the behavior of biting, mouthing, or licking the electronic pen is repeated, saliva may enter the inside of the electronic pen from the gap between the core body and the casing at the front end part of the electronic pen. In addition, for the electronic pen mounted with the electronic circuit and the like, it is important to prevent the entry of water from the gap between the core body and the casing at the front end part of the electronic pen also in cases other than the case where the "habitual" behavior described above is performed. Yet, complicating the configuration for adding a waterproof function or degrading functions of the electronic pen should be avoided.

BRIEF SUMMARY

In view of the above, it is an object of the present disclosure to be able to effectively prevent the entry of water such as saliva, for example, from a gap between a core body and a casing at a front end part of an electronic pen without complicating a configuration or degrading functions of the electronic pen.

In order to solve the above-described problems, there is provided an electronic pen including a casing that is a tubular body having an opening portion at a front end, has a ring-shaped protruding portion protruding toward an axis from an inner wall surface in a vicinity of the opening portion, and is mounted with a circuit part, a core body that is a rod-shaped body including a pen tip portion and a shaft portion extending from a rear end surface of the pen tip portion, the pen tip portion and the shaft portion having the same central axis, and an area of the rear end surface of the pen tip portion being larger than an area of a front end surface of the shaft portion, and a ring-shaped elastic member that is a ring-shaped member so provided as to be penetrated by the shaft portion in a part in which a front end surface of the protruding portion of the casing and the rear end surface of the pen tip portion of the core body are opposite to each other when the core body is inserted through the opening portion of the casing from a rear end side and a rear end portion of the core body is attached to an inside of the casing, the ring-shaped elastic member having an inclined side surface by having a small opening on a pen tip side and having a large opening on a rear end side.

According to the electronic pen of the present disclosure, between the front end surface of the protruding portion provided to the inner wall surface in the vicinity of the opening portion of the casing and the rear end surface of the pen tip portion of the core body attached to the inside of the casing, the ring-shaped elastic member is so provided as to be penetrated by the shaft portion of the core body. The ring-shaped elastic member has an inclined side surface by having a small opening on the pen tip side and a large opening on the rear end side. The ring-shaped elastic member fills a gap (void) formed between the pen tip portion of the core body and the casing, and prevents the entry of liquid from the outside. In addition, owing to its shape, the ring-shaped elastic member can appropriately transmit a pen pressure without hindering sliding movement of the core body according to the pen pressure, and consequently does not degrade functions of the electronic pen.

DETAILED DESCRIPTION

Embodiments of an electronic pen according to the present disclosure will hereinafter be described with reference to the drawings. The description will be made by taking as an example a case where the electronic pens according to the embodiments to be described in the following are of an active capacitive type that sends out a signal from an electronic pen side such that an indicated position is detected according to a position on a position detecting sensor at which the signal is received.

First Embodiment

Example of Configuration of Electronic Pen of Active Capacitive Type

Figure 1:
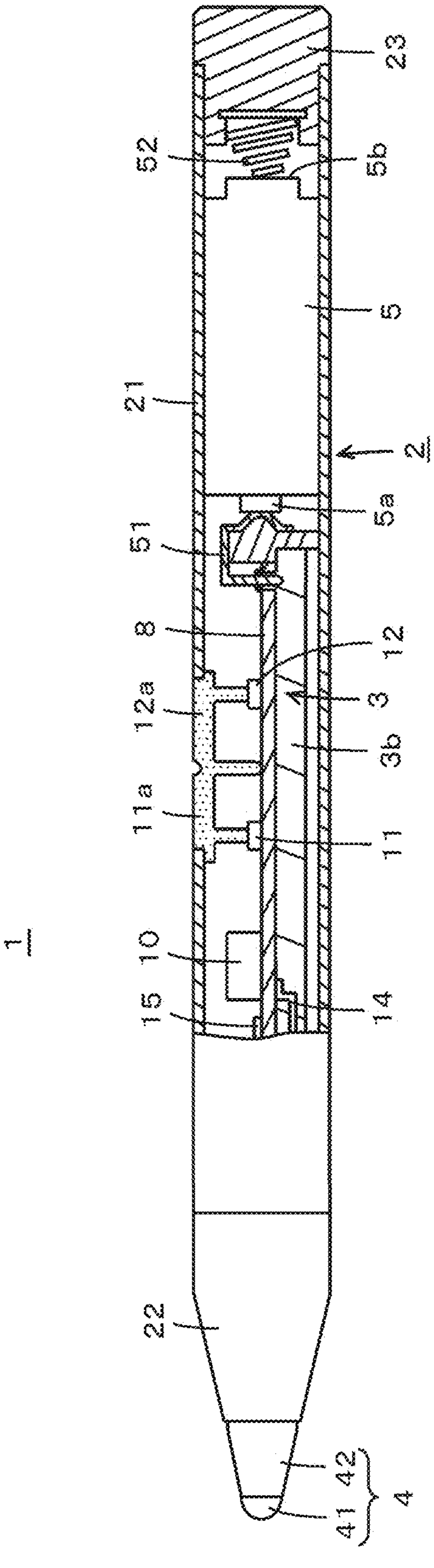
FIG. 1 is a diagram of assistance in explaining an example of a configuration of an electronic pen according to a first embodiment.
Figures 2A, 2B:
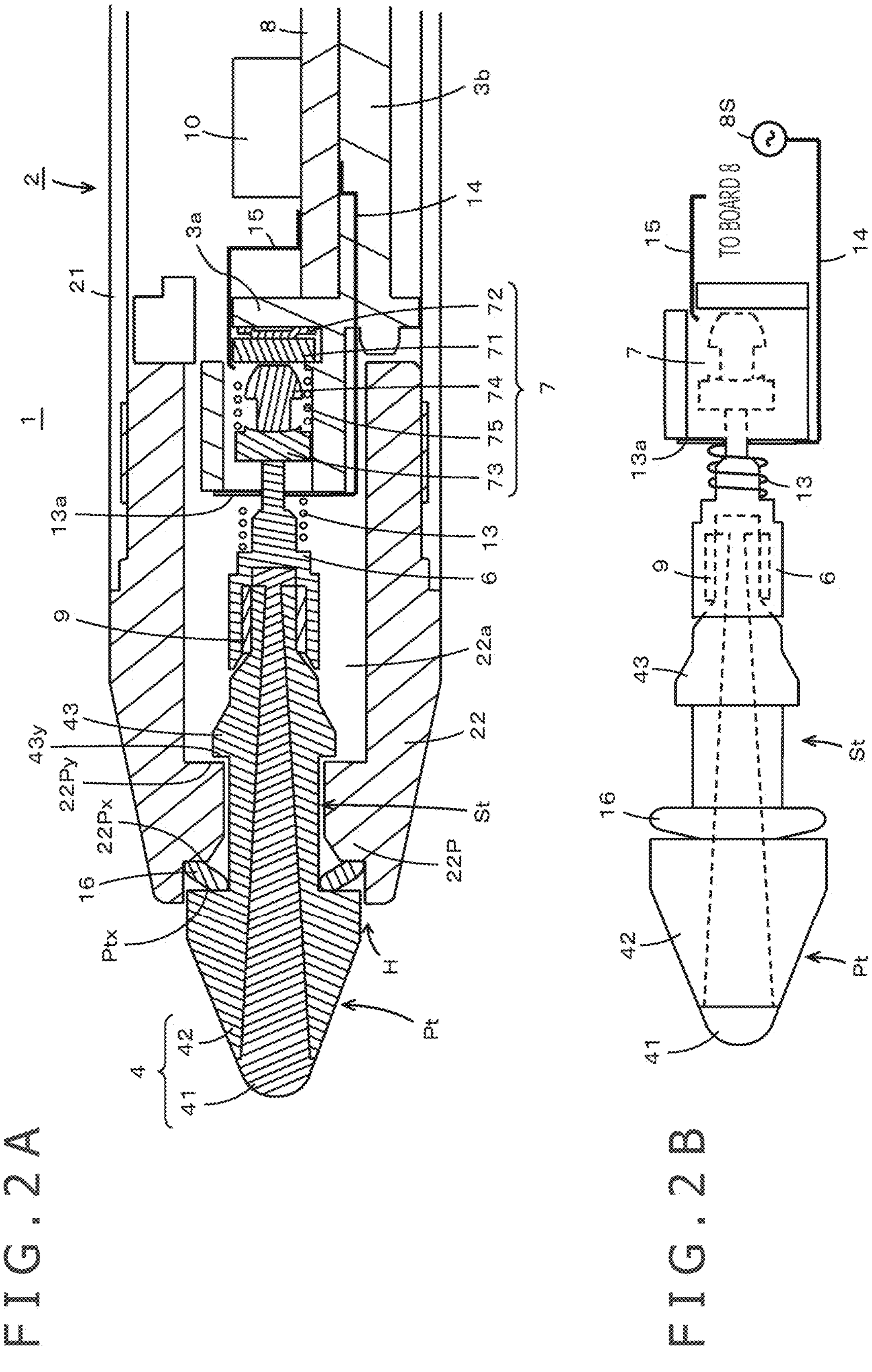
FIGS. 2A and 2B are diagrams of assistance in explaining principal parts of the electronic pen according to the first embodiment.

FIG. 1 is a diagram of assistance in explaining an example of a configuration of an electronic pen 1 according to the present embodiment. For the purpose of description, a part of a case (casing) 2 of the electronic pen 1 is sectioned in FIG. 1 to illustrate an inside thereof. In addition, FIGS. 2A and 2B are diagrams of assistance in explaining principal parts of the electronic pen 1. Specifically, FIG. 2A is an enlarged sectional view of principal parts on a pen tip side of the electronic pen 1 which are not illustrated in FIG. 1. In addition, FIG. 2B is a diagram schematically illustrating extracted parts for implementing functions of pen pressure detection and signal transmission in the electronic pen 1.

As illustrated in FIG. 1, the electronic pen 1 has the case (casing) 2 in a cylindrical shape that is elongated in an axial direction (direction along an axis), one side thereof in the axial direction being a pen tip side and having an opening portion, and another side thereof in the axial direction being closed. This case 2 is formed of a conductive material, or anodized aluminum in the present example. The case 2 includes a cylindrical case main body 21 internally having a hollow portion as well as a front cap 22 and a rear cap 23 coupled to the case main body 21. The case 2 is formed by the front cap 22 and the rear cap 23 being fitted to the case main body 21.

As illustrated in FIG. 2A, the front cap 22 is of a configuration of a tubular body having a through hole 22*a* in the axial direction, and is of a tapered shape such that the external shape of a part thereof on the pen tip side of the electronic pen 1 is reduced in outside diameter toward the pen tip. An end portion on the pen tip side of the front cap 22 forms an opening portion H of the through hole 22*a*. The hollow portion of the case 2 internally houses a board holder 3 for holding mounted parts such as a printed board 8 and a battery 5, as illustrated in FIG. 1, and internally houses a core body holder (core body holding portion) 6 and pressure sensing parts (pen pressure detecting unit) 7, as illustrated in FIG. 2A.

In addition, as illustrated in FIG. 2A, an inner wall surface in the vicinity of the opening portion H of the front cap 22 is provided with a ring-shaped protruding portion 22P protruding toward the axis. That is, the inner wall surface slightly to a rear end side from the opening portion H of the front cap 22 is provided with the protruding portion 22P protruding inward in a ring shape. Hence, as illustrated in FIG. 2A, a part on the opening portion H side of a front end surface 22Px of the protruding portion 22P of the front cap 22 forms a cup-shaped portion fitted with a rear end part of a pen tip portion Pt of a core body 4 to be described later. Incidentally, an edge portion on the pen tip side of the protruding portion 22P is provided with such a slope that is cut obliquely, so that the core body 4 can easily be inserted into the case 2.

Further, as illustrated in FIG. 1 and FIG. 2A, the core body 4 is inserted into the through hole 22*a* through the opening portion H of the front cap 22, and is attached to the core body holder 6 within the case 2. In addition, the core body 4 is removable from the core body holder 6. That is, the core body 4 is attachable to and detachable from the inside of the case 2. As will be described later in detail, the core body 4 includes a core rod 41 formed of a conductive material and a protective member 42 formed of a non-conductive material, and the external appearance of the core body 4 is constituted by two roughly divided parts of a pen tip portion Pt and a shaft portion St.

The board holder 3 is formed by insulative resin, for example, a liquid crystal polymer. The board holder 3 has such a configuration that, when housed within the hollow portion of the case 2, as illustrated in FIG. 2A, a pressure sensing part retaining portion 3*a* and a printed board mounting base portion 3*b* are continuous with each other in the axial direction of the electronic pen 1. The pressure sensing part retaining portion 3*a* is of a cylindrical shape having a hollow portion for housing the pressure sensing parts 7 (a plurality of parts for pen pressure detection). The pressure sensing part retaining portion 3*a* has an outside diameter smaller than the inside diameter of the through hole 22*a* of the front cap 22. The printed board mounting base portion 3*b* is of a boat shape in which the printed board 8 is mounted and held. Specifically, the printed board mounting base portion 3*b* is of such a shape that a tubular body is sectioned substantially in half in the axial direction.

The board holder 3 is so fixed as not to move after the whole of the pressure sensing part retaining portion 3*a* and the printed board mounting base portion 3*b* is housed within the case 2 with the pressure sensing part retaining portion 3*a* on the core body 4 side. In addition, as illustrated in FIG. 2A, the core body holder 6 holding the core body 4 is coupled to the pressure sensing part retaining portion 3*a* of the board holder 3, and a pressure (pen pressure) applied mainly to the core rod 41 of the core body 4 is transmitted to the pressure sensing parts 7 inside the pressure sensing part retaining portion 3*a*.

As illustrated in FIG. 1, an end portion of the printed board mounting base portion 3*b* of the board holder 3 which is on an opposite side of the pressure sensing part retaining portion 3*a* is provided with a terminal conductor 51. This terminal conductor 51 electrically abuts against a positive side terminal 5*a* of the battery 5, and is electrically connected to a copper foil pattern of a power supply line of the printed board 8. A fitting portion to be fitted into the case main body 21 in the rear cap 23 is provided with a coil spring terminal 52 that is formed of a conductive metal and that is electrically connected to a negative side terminal 5*b* of the battery 5. As illustrated in FIG. 1, the battery 5 is inserted into the case 2 such that the positive side terminal 5*a* is connected to the terminal conductor 51. Thereafter, the rear cap 23 is fitted into the case main body 21 such that the coil spring terminal 52 presses the negative side terminal 5*b* of the battery 5.

In the present embodiment, the case main body 21 formed of a conductive material is electrically connected to a grounding conductor of the printed board 8. Since the rear cap 23 and the case main body 21 are formed of a conductive material, the negative side terminal 5*b* of the battery 5 is electrically connected to the grounding conductor of the printed board 8 via the rear cap 23 and the case main body 21. Meanwhile, the positive side terminal 5*a* of the battery 5 is connected to the copper foil pattern of the power supply line of the printed board 8 through the terminal conductor 51. Thus, a voltage of the battery 5 is supplied as a power supply voltage for a circuit formed on the printed board 8.

A circuit section constituted by a signal generating circuit 8S, an integrated circuit (IC) 10, and peripheral circuit parts thereof is provided on the printed board 8. The signal generating circuit 8S generates a signal to be sent out from the core rod 41 of the electronic pen 1. The IC 10 constitutes a control circuit that controls the transmission of the signal from the signal generating circuit 8S to the core rod 41. The peripheral circuit parts include push switches (side switches) 11 and 12. In addition, the printed board 8 is connected with a conductor terminal member 14 connecting the core rod 41 and the signal generating circuit 8S to each other and a conductor terminal member 15 for transmitting the detection output of a pen pressure from the pressure sensing parts 7.

As illustrated in FIG. 2A, the core body 4 is fitted to the core body holder 6 formed of a conductive material via a conductive elastic member 9, and is thereby coupled to and held by the core body holder 6. Further, the core body holder 6 is fitted to a holding member 73 of the pressure sensing parts 7 inside the pressure sensing part retaining portion 3*a* of the board holder 3. The pressure applied to the core body 4 (pen pressure) is thereby transmitted to the pressure sensing parts 7.

In this case, the core body holder 6 is configured to be biased to the core rod 41 side with respect to the board holder 3 at all times by a coil spring 13 as an example of an elastic member formed of a conductive material such as conductive metal, the coil spring 13 being provided between the core body holder 6 and the board holder 3. Incidentally, together with the conductor terminal member 14, the coil spring 13 constitutes an electric connection member for transmitting, to the core rod 41, the signal from the signal generating circuit 8S whose transmission is controlled by the IC 10 disposed on the printed board 8. Accordingly, a metallic plate 13*a* is provided to an end portion on the pen tip side of the pressure sensing part retaining portion 3*a* of the board holder 3 to electrically connect the coil spring 13 and the conductor terminal member 14 to each other.

That is, as illustrated in FIG. 2B, the signal from the signal generating circuit 8S is sent out from the core rod 41 to trace the conductor terminal member 14, the metallic plate 13*a*, the coil spring 13, the core body holder 6, and the core rod 41 in this order. The conductor terminal member 14, the coil spring 13, the metallic plate 13*a*, the core body holder 6, and the core rod 41 constitute an electric connection member, and form a path for sending out a position indication signal from the signal generating circuit 8S of the printed board 8.

The pressure sensing parts (pen pressure detecting unit) 7 in the present embodiment represent a case of using a variable capacitance capacitor that changes in capacitance according to the pen pressure applied to the core body 4. As illustrated in FIG. 2A, the pressure sensing parts 7 include a plurality of parts, that is, a dielectric 71, a terminal member 72, a holding member 73, a conductive member 74, and an elastic member 75. The terminal member 72 is formed of a conductive material, and constitutes a first electrode of the variable capacitance capacitor formed by the pressure sensing parts 7. In addition, the conductive member 74 is constituted by a conductive rubber, for example, and the elastic member 75 is constituted by a coil spring formed of a conductive material. The conductive member 74 and the elastic member 75 are electrically connected to each other to constitute a second electrode of the variable capacitance capacitor.

Hence, the capacitance of the variable capacitance capacitor formed between the terminal member 72 constituting the first electrode and the conductive member 74 constituting the second electrode changes according to the pressure applied to the core rod 41. This change in the capacitance of the variable capacitance capacitor is supplied from the pressure sensing parts 7 to the IC 10 provided on the printed board 8 through the conductor terminal member 15, so that the pen pressure is detected by the IC 10. That is, the IC 10 is a control circuit that controls the transmission of the signal from the signal generating circuit 8S to the core rod 41, and implements a function as a pen pressure detecting unit that detects (calculates) the pen pressure applied to the core body 4, in reference to the output signal from the pressure sensing parts 7. It is thus possible to include pen pressure information in a signal to be transmitted through the core rod 41, and transmit the signal.

In the electronic pen 1 according to the present embodiment, as illustrated in FIG. 2A, the core body 4 is fitted to the core body holder 6 inside the case 2, and is movable in the axial direction. Thus, the core body 4 is pushed into the case 2 according to the pen pressure applied to the core rod 41 by a user, and the core rod 41 and the core body holder 6 correspondingly press the pressure sensing parts 7, so that the pen pressure can be detected. In addition, when the pen pressure applied to the core rod 41 is released, the core body holder 6 and the core body 4 can be returned to an initial state illustrated in FIG. 2A by the action of the coil spring 13 described above.

The IC 10 of the electronic pen 1 performs control to send out, to the position detecting sensor, a burst signal (position indication signal) for coordinate detection (position detection) according to the signal from the signal generating circuit 8S. The position detecting sensor side can thus detect a position indicated by the electronic pen 1 on the position detecting sensor. Further, a circuit including the IC 10 formed on the printed board 8 of the electronic pen 1 performs an operation of detecting the pen pressure in reference to the capacitance in the pressure sensing parts 7 in a period in which the burst signal is sent out. After an end of the period of sending out the burst signal, the IC 10 sends out from the core rod 41 an encoded signal obtained by modulating the signal from the signal generating circuit 8S according to the detected pen pressure, and thereby notifies the position detecting sensor side of the pen pressure. Thus, the position detecting sensor side can also detect the pen pressure applied to the core body 4 of the electronic pen 1.

In the manner described above, the electronic pen 1 according to the present embodiment indicates a position on the position detecting sensor to the position detecting sensor, and implements a function of detecting the pen pressure applied to the core rod 41 and notifying the position detecting sensor of the pen pressure. Further, the electronic pen 1 according to the present embodiment enables also an inclination of the electronic pen 1 to be appropriately detected on the position detecting sensor side according to a signal sent out from the core rod 41 having conductivity.

Example of Configuration of Core Body 4

As illustrated in FIG. 2A, the core body 4 includes the core rod 41 and the protective member 42. The core rod 41 is a conductive rod-shaped body. In the present embodiment, the core rod 41 is formed with use of a conductive elastomer. The conductive elastomer is rubber to which conductivity is imparted by substantially uniformly mixing conductive particles (carbon, metallic powder, metallized powder, or the like) in a highly insulative rubber material at a certain mixture ratio. Hence, the core rod 41 is a soft core rod having elasticity, and realizes a pen tip with what is generally called a soft writing feeling.

As illustrated in FIG. 2A, the protective member 42 protects the core rod 41 by covering the side surface of an intermediate portion of the core rod 41 excluding a front end portion and a rear end portion thereof. In the present embodiment, the protective member 42 is formed by polycarbonate. Polycarbonate is one type of thermally reversible plastic, and has properties of being softened by being heated and becoming able to be molded into a desired shape, and being solidified when cooled.

Hence, in forming the core body 4, the core rod 41 in which the conductive elastomer is used as a material is molded first. Then, the core body 4 having the protective member 42 on the side surface of the intermediate portion of the core rod 41 can be formed by what is generally called two-color molding, which forms the protective member 42 (secondary side) by injecting polycarbonate into the same mold as the core rod 41 (primary side). Incidentally, the two-color molding is a member molding method referred to also as dissimilar material molding or double molding.

As also described above, the external appearance of the core body 4 is a rod-shaped body constituted by two roughly divided parts of the pen tip portion Pt and the shaft portion St. The pen tip portion Pt constitutes the pen tip of the electronic pen 1. As illustrated in FIGS. 2A and 2B, the pen tip portion Pt is a part in a tapered shape (substantially conical shape) tapered toward a front end. A rounded front end portion of the core rod 41 protrudes from the vertex part. The shaft portion St is a part extended rearward from a rear end surface of the pen tip portion Pt.

As is understood from FIGS. 2A and 2B, the pen tip portion Pt and the shaft portion St have the same central axis, and the area of the rear end surface of the pen tip portion Pt is larger than the area of a front end surface of the shaft portion St. Hence, a part other than a part joined to the shaft portion St in the rear end surface Ptx of the pen tip portion Pt is exposed in a ring shape. In addition, the side surface of the shaft portion St is provided with a shaft portion protrusion 43. As illustrated in FIGS. 2A and 2B, the shaft portion protrusion 43 is provided with such a slope as to be lowered toward the rear end side. Hence, when the core body 4 is inserted from the opening portion H and is fitted to the inside of the case 2, the shaft portion protrusion 43 of the core body 4 abuts against the protruding portion 22P of the front cap 22 of the case 2. However, due to the slope provided to the shaft portion protrusion 43, which slope is lowered from the pen tip side to the rear end side, the core body 4 can relatively smoothly be pushed into the case 2 and fitted to the core body holder 6.

Meanwhile, as illustrated in FIG. 2A, after the core body 4 is fitted to the core body holder 6, a front end surface 43*y* of the shaft portion protrusion 43 and a rear end surface 22Py of the protruding portion 22P within the front cap 22 are opposed to and engaged with each other. Thus, even when the core body 4 fitted to the core body holder 6 within the case 2 is to be extracted from the case 2, the core body 4 cannot easily be extracted due to the engagement between the front end surface 43*y* of the shaft portion protrusion 43 and the rear end surface 22Py of the protruding portion 22P.

Hence, a pupil, for example, using the electronic pen 1 is prevented from easily extracting the core body 4 by, for example, biting the pen tip portion Pt of the core body 4 with teeth. Yet, the core body 4 can be extracted (removed) when force is carefully applied to the pen tip portion Pt part of the core body 4 fitted to the core body holder 6 by pinching the pen tip portion Pt part with the nails of fingers or the like to extract the core body 4. Hence, the core body 4 can also be replaced as necessary. Further, a ring-shaped elastic member 16 is fitted to the core body 4. The entry of water from the pen tip part of the electronic pen 1 is thus prevented, and a waterproof property is enhanced.

Specifically, as illustrated in FIG. 2A, in the case of the electronic pen 1 according to the present embodiment, the ring-shaped elastic member 16 is disposed between the core body 4 and the case 2. The ring-shaped elastic member 16 is formed in a ring shape by a through hole being provided in a circular elastic member. The ring-shaped elastic member 16 has a short diameter in an opening on the pen tip side of the through hole, and has a long diameter in an opening on the rear end side of the through hole. Therefore, the side surfaces of the ring-shaped elastic member 16 are inclined, and the section of the ring-shaped elastic member 16 spreads toward a rear end, as illustrated in FIG. 2A. Owing to the function of the ring-shaped elastic member 16, a gap (void) formed between the core body 4 and the case 2 in a front end part of the electronic pen 1 is closed to prevent the entry of water.

That is, owing to the presence of the ring-shaped elastic member 16, even when a pupil bites, mouths, or licks the pen tip side of the electronic pen 1, for example, saliva is prevented from entering the inside of the electronic pen 1. In addition, even when, for example, water, tea, or the like is spilled on the pen tip side of the electronic pen 1, the water, the tea, or the like is prevented from entering the inside of the electronic pen 1. In addition, the use of the ring-shaped elastic member 16 having inclined side surfaces enables the detection of the pen pressure to be performed appropriately without hindering sliding movement in the axial direction of the core body 4 according to the pen pressure. In the following, description will be made of details of a configuration on the pen tip side of the electronic pen 1 including the ring-shaped elastic member 16.

Usage of Ring-Shaped Elastic Member 16

Figure 3A:
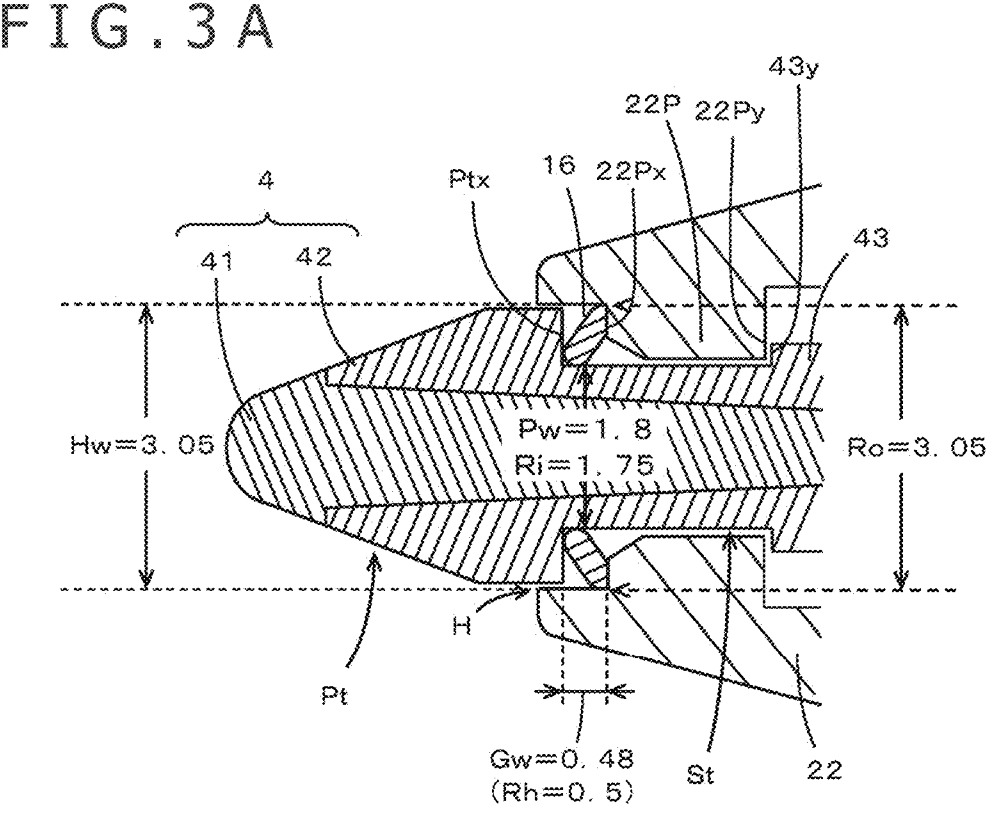
FIGS. 3A, 3B, and 3C are diagrams of assistance in explaining a ring-shaped elastic member and the like used in the electronic pen according to the first embodiment.
Figure 3B:
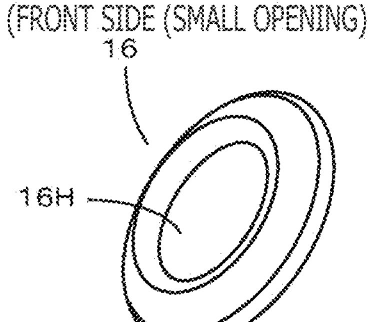
Figure 3C:
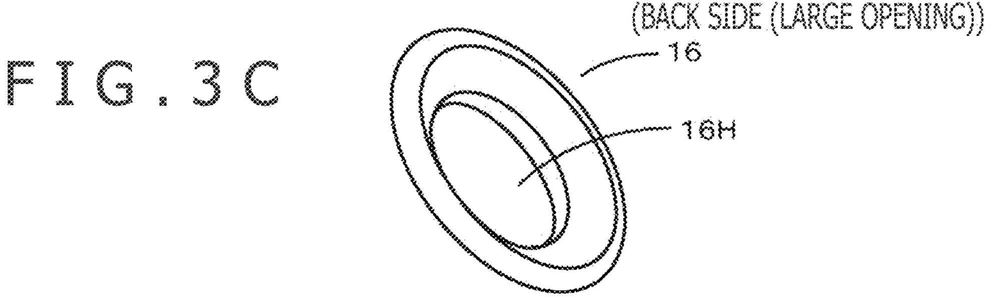

FIGS. 3A through 3C are diagrams of assistance in explaining the ring-shaped elastic member 16 and the like used in the electronic pen 1. Specifically, FIG. 3A is an enlarged sectional view of a pen tip side part of the electronic pen 1 provided with the ring-shaped elastic member 16. In addition, FIG. 3B is a perspective view in a case where the ring-shaped elastic member 16 is viewed from a front side (pen tip side). FIG. 3C is a perspective view in a case where the ring-shaped elastic member 16 is viewed from a back side (rear end side).

In the ring-shaped elastic member 16 according to the present embodiment, as illustrated in FIGS. 3B and 3C, the diameter of the opening on the front side (pen tip side) of a through hole 16H is shorter than the diameter of the opening on the back side (rear end side) of the through hole 16H. Hence, because the ring-shaped elastic member 16 has a small opening on the front side of the through hole 16H and has a large opening on the back side of the through hole 16H, the side surfaces of the ring-shaped elastic member 16 are inclined in such a manner as to open toward a rear end from the pen tip side, and thus the ring-shaped elastic member 16 is shaped like a bottomless dish. Hence, as with the sectional shape of the ring-shaped elastic member 16 illustrated in FIG. 2A, the sectional shape of the ring-shaped elastic member 16 in the sectional view of FIG. 3A opens toward the rear end from the pen tip side.

As illustrated in FIG. 3A, the shaft portion St of the core body 4 penetrates the through hole 16H of the ring-shaped elastic member 16, and the ring-shaped elastic member 16 is attached to the core body 4. In this case, the ring-shaped elastic member 16 is fitted at such a position that the surface on the front side (end surface on the pen tip side) of the ring-shaped elastic member 16 is in contact with the rear end surface of the pen tip portion Pt of the core body 4. The core body 4 to which the ring-shaped elastic member 16 is attached is inserted through the opening portion H of the front cap 22 from the rear end side of the core body 4, and is fitted to the core body holder 6 within the case 2. Consequently, as illustrated in FIG. 3A, the ring-shaped elastic member 16 is located between the rear end surface Ptx of the pen tip portion Pt of the core body 4 and the front end surface 22Px of the protruding portion 22P of the front cap 22 of the case 2.

As illustrated in FIG. 3A, a diameter Hw of the opening portion H in the front cap 22 of the case 2 of the electronic pen 1 according to the present embodiment is 3.05 mm. Hence, a diameter of the bottom surface of the pen tip portion Pt of the core body 4 is slightly shorter than the diameter Hw of the opening portion H of the front cap 22. Further, in the electronic pen 1, as illustrated in FIG. 3A, a diameter Pw of the shaft portion St between the rear end surface Ptx of the pen tip portion Pt of the core body 4 and the front end surface 43$y$ of the shaft portion protrusion 43 of the core body 4 is 1.8 mm. Hence, an inside diameter of the protruding portion 22P part of the front cap 22 is slightly longer than the diameter Pw of the corresponding part of the shaft portion St. In addition, as illustrated in FIG. 3A, there is a distance Gw of 0.48 mm between the rear end surface Ptx of the pen tip portion Pt of the core body 4 and the front end surface 22Px of the protruding portion 22P of the front cap 22 at a time of a non-usage state (state in which no pen pressure is applied to the core body 4) after the core body 4 is fitted to the inside of the case 2.

Meanwhile, as illustrated in FIG. 3A, a diameter (inside diameter) Ri of the opening on the front side of the ring-shaped elastic member 16 is 1.75 mm, an outside diameter Ro of a rear end of the ring-shaped elastic member 16 is 3.05 mm, and a height (height from the lower surface to the upper surface of the through hole 16H) Rh of the ring-shaped elastic member 16 is 0.5 mm. Hence, the diameter (inside diameter) Ri of the opening on the front side of the ring-shaped elastic member 16 is shorter than the diameter Pw of the shaft portion St of the core body 4, and the height Rh of the ring-shaped elastic member 16 is longer than the distance Gw between the rear end surface Ptx of the pen tip portion Pt and the front end surface 22Px of the protruding portion 22P of the front cap 22.

However, the ring-shaped elastic member 16 is formed by an elastic material capable of expansion and contraction. Suppose that, in the present embodiment, the ring-shaped elastic member 16 is formed by silicon rubber with a hardness of A30, for example. Hence, when the ring-shaped elastic member 16 is fitted to the shaft portion St of the core body 4, the opening part on the pen tip side of the ring-shaped elastic member 16 expands, and the ring-shaped elastic member 16 can be fitted easily. After the fitting, the ring-shaped elastic member 16 is in close contact with the shaft portion St. In addition, as illustrated in FIG. 2A and FIG. 3A, the ring-shaped elastic member 16 is fitted at such a position that the front end surface of the ring-shaped elastic member 16 is in contact with the rear end surface Ptx of the pen tip portion Pt of the core body 4.

Further, suppose that, as illustrated in FIG. 3A, the core body 4 fitted with the ring-shaped elastic member 16 is fitted to the core body holder 6 within the case 2. The outside diameter Ro of the rear end of the ring-shaped elastic member 16 is 3.05 mm, which is the same as the diameter Hw of the opening portion H of the front cap 22. Hence, the side surface on the rear end side of the ring-shaped elastic member 16 is in contact with the inner wall surface of the opening portion H of the front cap 22. In addition, the distance Gw between the rear end surface Ptx of the pen tip portion Pt and the front end surface 22Px of the protruding portion 22P of the front cap 22 is 0.48 mm.

In this case, the ring-shaped elastic member 16 is sandwiched between the rear end surface Ptx of the pen tip portion Pt of the core body 4 and the front end surface 22Px of the protruding portion 22P, and the ring-shaped elastic member 16 is compressed in the axial direction, that is, contracts in the axial direction, but expands in a direction intersecting the axial direction. Thus, the front end surface of the ring-shaped elastic member 16 is in close contact with the rear end surface Ptx of the pen tip portion Pt of the core body 4, and a rear end part of the ring-shaped elastic member 16 is in close contact with the inner wall surface of the opening portion H of the front cap 22 and the front end surface 22Px of the protruding portion 22P within the front cap 22.

When the core body 4 fitted with the ring-shaped elastic member 16 is thus fitted to the core body holder 6 within the case 2, a part on the pen tip side of the ring-shaped elastic member 16 is in close contact with the rear end surface Ptx of the pen tip portion Pt of the core body 4 and the side surface of the shaft portion St of the core body 4, as illustrated in FIG. 3A. At the same time, as illustrated in FIG. 3A, a part on the rear end side of the ring-shaped elastic member 16 is in close contact with the front end surface 22Px of the protruding portion 22P of the front cap 22 and the inner wall surface of the opening portion H of the front cap 22. The void (gap) formed between the front cap 22 and the core body 4 on the pen tip side of the electronic pen 1 is thereby completely closed by the ring-shaped elastic member 16. The inflow of water can thus be prevented.

In addition, as illustrated in FIG. 3A, the side surfaces of the ring-shaped elastic member 16 are inclined. Thus, the part on the pen tip side of the ring-shaped elastic member 16 can move in the axial direction with the rear end side part of the ring-shaped elastic member 16 as a supporting point, the rear end side part being in close contact with the front end surface 22Px of the protruding portion 22P of the front cap 22 and the inner wall surface of the opening portion H of the front cap 22. Hence, when a pen pressure is applied to the core body 4, the core body 4 can be slidingly moved in such a manner as to be pushed into the case 2. The pen pressure can consequently be transmitted to the pressure sensing parts 7 appropriately. Hence, accuracy of detection of the pen pressure is not decreased.

Incidentally, in the present specification, A30, which is the hardness of silicon rubber, refers to a hardness measured by use of a "durometer of type A" based on the International Standardization Organization (ISO) as a measuring instrument. That is, the hardness of A30 indicates that the hardness measured by a durometer of type A is 30 degrees.

Second Embodiment

As described with reference to FIGS. 3A through 3C, the side surfaces of the ring-shaped elastic member 16 according to the first embodiment described above are inclined since the diameter of the opening on the front side (pen tip side) of the through hole 16H is shorter than the diameter of the opening on the back side (rear end side) of the through hole 16H. The ring-shaped elastic member 16 according to the first embodiment is thus shaped like a bottomless dish. Hence, when a pen pressure higher than is necessary is applied, a heavy load is applied to the ring-shaped elastic member 16, and there is considered to be a possibility that the ring-shaped elastic member 16 is reflexed (turned back), and is set in a state of opening from the rear end side to the pen tip side, which is opposite from a normal state. In this case, there is a fear of occurrence of a decrease in waterproof effect and a decrease in the accuracy of detection of the pen pressure.

Accordingly, an electronic pen 1A according to a second embodiment to be described in the following uses a ring-shaped elastic member 16A provided with rib portions in order to prevent the occurrence of the reflexing (turning back) even when a high pen pressure is applied. Further, in the electronic pen 1A according to the second embodiment, in order to be able to appropriately detect the pen pressure without a decrease in the accuracy of detection of the pen pressure even when the ring-shaped elastic member 16A provided with the rib portions is used, the position of a protruding portion 22AP provided in the vicinity of an opening portion AH on the pen tip side of a front cap 22A is devised.

Incidentally, also in the case of the electronic pen 1A according to the second embodiment, parts other than the ring-shaped elastic member 16A and the protruding portion 22AP of the front cap 22A are configured similarly to those in the case of the electronic pen 1 according to the first embodiment described above. Hence, in the figures used to describe the electronic pen 1A according to the second embodiment, the parts configured similarly to those in the electronic pen 1 according to the first embodiment are identified by the same reference numerals, and detailed description of the parts will be redundant and will hence be omitted.

Figure 4A:
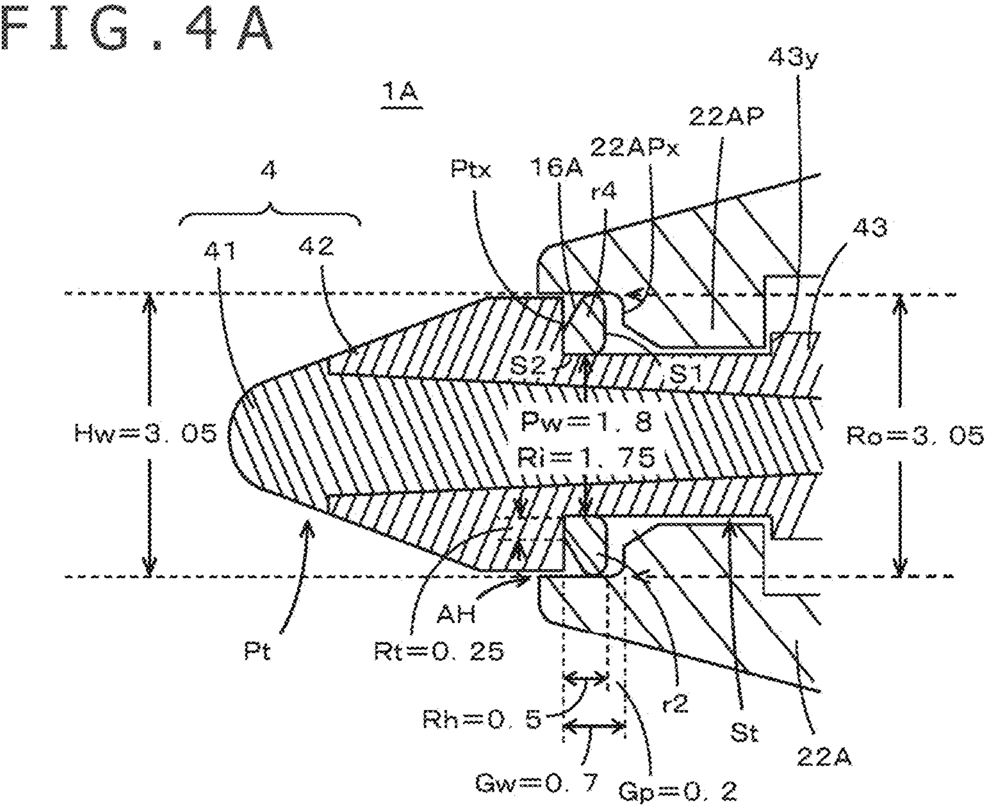
FIGS. 4A, 4B, and 4C are diagrams of assistance in explaining principal parts of the electronic pen according to a second embodiment.
Figure 4B:
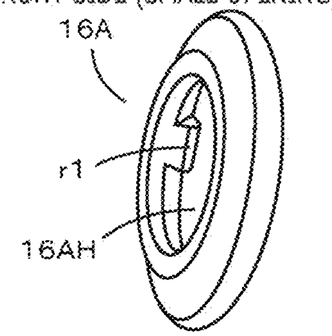
Figure 4C:
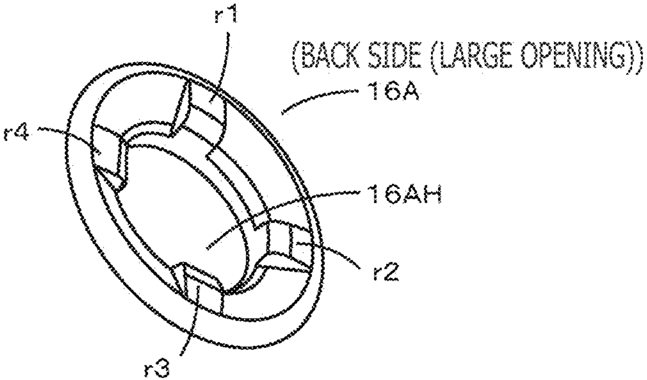

FIGS. 4A to 4C are diagrams of assistance in explaining principal parts of the electronic pen 1A according to the second embodiment. Specifically, FIG. 4A is an enlarged sectional view of a pen tip side part provided with the ring-shaped elastic member 16A in the electronic pen 1A according to the second embodiment. In addition, FIG. 4B is a perspective view of the ring-shaped elastic member 16A as viewed from the front side (pen tip side), and FIG. 4C is a perspective view of the ring-shaped elastic member 16A as viewed from the back side (rear end side).

The ring-shaped elastic member 16A according to the second embodiment is also formed in a ring shape by a through hole 16AH being provided in a circular elastic member. In the ring-shaped elastic member 16A, as illustrated in FIGS. 4B and 4C, the diameter of an opening on the front side (pen tip side) of the through hole 16AH is shorter than the diameter of an opening on the back side (rear end side) of the through hole 16AH. Hence, as in the case of the ring-shaped elastic member 16 according to the first embodiment, since the ring-shaped elastic member 16A also has a small opening on the front side of the through hole 16AH and has a large opening on the back side of the through hole 16AH, the side surfaces of the ring-shaped elastic member 16A are inclined. However, unlike the ring-shaped elastic member 16 according to the first embodiment, the ring-shaped elastic member 16A according to the second embodiment is provided with rib portions r1, r2, r3, and r4 on the back side of the side surfaces (inside of the side surface), as illustrated in FIGS. 4B and 4C.

While the rib is a word meaning "costa," in the field of machine parts and the like, the rib means a reinforcing member provided to reinforce, for example, a flat plate portion or a thin part. In the case of the ring-shaped elastic member 16A, as illustrated in FIG. 4C, the rib portions r1, r2, r3, and r4 are provided at four positions so set as to shift a radius by 90 degrees on an outer circumference of the back side of the side surfaces of the ring-shaped elastic member 16A with the center of the through hole 16H as a reference. The ring-shaped elastic member 16A in the second embodiment, including the rib portions r1, r2, r3, and r4, is formed integrally by silicon rubber having a hardness of A30.

As with the ring-shaped elastic member 16 according to the first embodiment, the ring-shaped elastic member 16A thus provided with the rib portions r1, r2, r3, and r4 is also used in a state of being fitted to the core body 4. In the case of the ring-shaped elastic member 16A, the thickness of the ring-shaped elastic member 16A is reinforced by the rib portions r1, r2, r3, and r4 being provided, so that the ring-shaped elastic member 16A is not reflexed (turned back) even when a high pen pressure is applied to the core body 4.

FIG. 4A represents a case of sectioning by a plane including the rib portions r4 and r2. An upper side of the ring-shaped elastic member 16A part is the rib portion r4. A lower side of the ring-shaped elastic member 16A part is the rib portion r2. As is understood by viewing the part of the rib portion r4 in FIG. 4A, the angle of a corner formed by the crossing of extensions of a side S1 and a side S2 of a section of the rib portion r4 is 90 degrees (right angle). A surface of the rib portion r4 which includes the side S1 is a surface opposed to a front end surface 22APx of the protruding portion 22AP of the front cap 22A. A surface of the rib portion r4 which includes the side S2 is a surface in contact with the side surface of the shaft portion St of the core body 4. In addition, a surface including an oblique side of the section of the rib portion r4 (side connecting another end of the side S1 and another end of the side S2 to each other) is an inclined side surface of the ring-shaped elastic member 16A. The other rib portions r1, r2, and r3 are also formed in a manner similar to that of the rib portion r4.

As illustrated in FIG. 4A, as with the ring-shaped elastic member 16 according to the first embodiment, the shaft portion St of the core body 4 penetrates the through hole 16AH of the ring-shaped elastic member 16A, and the ring-shaped elastic member 16A is thereby attached to the core body 4. The core body 4 to which the ring-shaped elastic member 16A is attached is inserted through the opening portion AH of the front cap 22A from the rear end side of the core body 4, and is fitted to the core body holder 6 within a case 2A, which is not illustrated in the figure. A mode of fitting of the core body 4 to the core body holder 6 in this case is as illustrated in FIG. 2A. Consequently, as illustrated in FIG. 4A, the ring-shaped elastic member 16A is located in a void formed between the rear end surface Ptx of the pen tip portion Pt of the core body 4 and the front end surface 22APx of the protruding portion 22AP of the front cap 22A.

Incidentally, as will be described later in detail, in the present second embodiment, a gap Gp is provided as a void (gap) within the void formed between the rear end surface Ptx of the pen tip portion Pt and the front end surface 22APx of the protruding portion 22AP of the front cap 22A. Hence, the position of the front end surface 22APx of the protruding portion 22AP is a position shifted to the rear end side in the axial direction as compared with the case of the protruding portion 22P in the first embodiment.

Also in the case of the electronic pen 1A according to the present second embodiment, as illustrated in FIG. 4A, a diameter Hw of the opening portion AH of the front cap 22A is 3.05 mm. Hence, the diameter of the bottom surface of the pen tip portion Pt of the core body 4 is slightly shorter than the diameter Hw of the opening portion AH of the front cap 22A. Further, also in the electronic pen 1A, as illustrated in FIG. 4A, a diameter Pw of the shaft portion St between the rear end surface Ptx of the pen tip portion Pt of the core body 4 and the front end surface 43*y* of the shaft portion protrusion 43 of the core body 4 is 1.8 mm. Hence, the inside diameter of the protruding portion 22AP part of the front cap 22A is slightly longer than the diameter Pw of the corresponding part of the shaft portion St.

Meanwhile, as illustrated in FIG. 4A, a length (inside diameter of the ring-shaped elastic member 16A) Ri between opposed rib portions of the ring-shaped elastic member 16A is 1.75 mm, and an outside diameter Ro of a rear end of the ring-shaped elastic member 16A is 3.05 mm. Hence, the length Ri between the rib portions of the ring-shaped elastic member 16A is shorter than the diameter Pw of the shaft portion St of the core body 4. However, the ring-shaped elastic member 16A is formed by silicon rubber with a hardness of A30. Hence, when the ring-shaped elastic member 16A is fitted to the shaft portion St of the core body 4, the periphery of the through hole of the ring-shaped elastic member 16A stretches slightly, and is fitted to be in close contact with the shaft portion St.

In this case, as illustrated in FIG. 4A, the ring-shaped elastic member 16A is fitted at such a position that the front end surface of the ring-shaped elastic member 16A is in contact with the rear end surface Ptx of the pen tip portion Pt of the core body 4. As illustrated in FIG. 4A, the front end surface of the ring-shaped elastic member 16A has a width Rt of approximately 0.25 mm in a direction intersecting the axis. This part is in contact with the rear end surface Ptx of the pen tip portion Pt. In addition, both the diameter Hw of the opening portion AH of the front cap 22A and the outside diameter Ro of the rear end of the ring-shaped elastic member 16A are 3.05 mm. Hence, an outer edge part on the rear end side of the ring-shaped elastic member 16A and the inner wall surface of the opening portion AH of the front cap 22A are in contact with each other.

Thus, the periphery of the through hole of the ring-shaped elastic member 16A slightly stretches and comes into close contact with the side surface of the shaft portion St, and the front end surface of the ring-shaped elastic member 16A is fitted in such a manner as to be in contact with the rear end surface Ptx of the pen tip portion Pt of the core body 4. Further, the core body 4 fitted with the ring-shaped elastic member 16A is fitted to the core body holder 6 within the case 2A. In this case, the outer edge part on the rear end side of the ring-shaped elastic member 16A and the inner wall surface of the opening portion AH of the front cap 22A, which have the same diameter of 3.05 mm, are in contact with each other, as described above. The occurrence of a gap (void) is thereby prevented between the core body 4 and the ring-shaped elastic member 16A and between the inner wall surface of the opening portion AH of the front cap 22A and the ring-shaped elastic member 16A. Hence, the ring-shaped elastic member 16A prevents the entry of water from a pen tip part of the electronic pen 1A.

In addition, as illustrated in FIG. 4A, there is a distance Gw of 0.7 mm between the rear end surface Ptx of the pen tip portion Pt of the core body 4 and the front end surface 22APx of the protruding portion 22AP of the front cap 22A at a time of a non-usage state (state in which no pen pressure is applied to the core body 4) after the core body 4 is fitted to the inside of the case 2A. Hence, the position of the front end surface 22APx of the protruding portion 22AP of the front cap 22A is moved back in the direction of the rear end by approximately 0.22 mm as compared with the case of the front cap 22 in the first embodiment illustrated in FIG. 3.

Meanwhile, as illustrated in FIG. 4A, a height (height from the lower surface to the upper surface of the through hole 16AH) Rh of the ring-shaped elastic member 16A is 0.5 mm. Hence, as illustrated in FIG. 4A, when the electronic pen 1A according to the present second embodiment is in the non-usage state, a gap Gp=0.2 mm occurs between the rear end surface of the ring-shaped elastic member 16A and the front end surface 22APx of the protruding portion 22AP of the front cap 22A. This gap Gp functions as an offset for preventing what is generally called a ink leakage phenomenon in the electronic pen 1A according to the second embodiment.

What is generally called the ink leakage phenomenon in an electronic pen will be described briefly. The pen pressure detection system of an electronic pen has what is generally called a hysteresis. The hysteresis means that the state of a certain system changes depending on not only a force currently being applied but also a force applied in the past. In the electronic pen 1A according to the second embodiment, a hysteresis occurs due to properties possessed by the ring-shaped elastic member 16A. Specifically, in a case where a pen pressure is applied to the core body 4 of the electronic pen 1A according to the second embodiment and the ring-shaped elastic member 16A is thereby compressed in the axial direction, even when the pen pressure is removed, the ring-shaped elastic member 16A does not return to an original state immediately, and returns to the original state gradually. This is because the ring-shaped elastic member 16A is provided with the rib portions r1, r2, r3, and r4, and thus a restoration speed of returning to the original state is slow as compared with the ring-shaped elastic member 16 according to the first embodiment.

Hence, even when the pen pressure is released after the pen pressure is applied to the pen tip portion Pt of the core body 4 of the electronic pen 1A, the detection output of the pen pressure from the pressure sensing parts 7 does not return to a 0 (zero) level immediately, and returns slowly while taking a certain amount of time. Thus, even after the release of the pen pressure, a state in which the pen pressure level exceeds a pen pressure determination threshold value may continue, and drawing by the drawing application may continue for a while. In this case, the drawing can be performed with the electronic pen merely present on the position detecting sensor though no pen pressure is being applied, and thus the user is given a feeling as if an ink leakage of a writing instrument occurred. Such a phenomenon specific to the electronic pen is referred to as the "ink leakage phenomenon" in the electronic pen.

Figure 5:
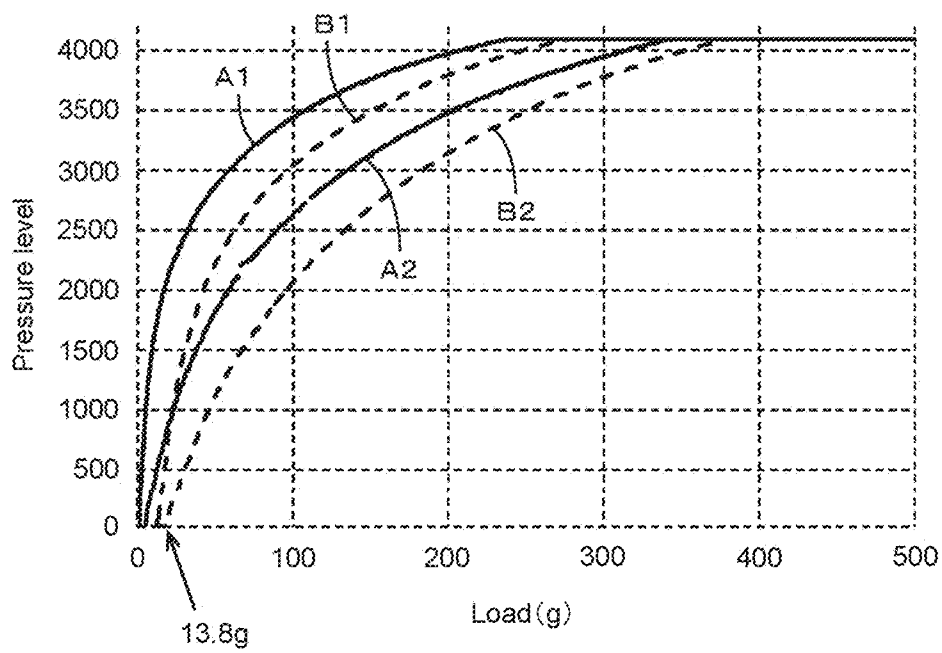
FIG. 5 is a diagram illustrating a hysteresis curve of a pen pressure detected by the electronic pen configured using the ring-shaped elastic member illustrated in FIGS. 4A to 4C.

FIG. 5 is a diagram illustrating a hysteresis curve of the pen pressure detected by the electronic pen configured using the ring-shaped elastic member 16A illustrated in FIGS. 4A to 4C. In FIG. 5, an axis of ordinates indicates the pressure (pen pressure) level (Pressure Level) applied to the core body 4, and an axis of abscissas indicates the detection output (load (gram), which is illustrated as Load (g) in FIG. 5) of the pen pressure detected through the pressure sensing parts 7. In addition, in FIG. 5, curves A1 and A2 are hysteresis curves of the detection output of the pen pressure of the electronic pen 1A provided with the gap Gp of 0.2 mm between the rear end surface of the ring-shaped elastic member 16A and the front end surface 22APx of the protruding portion 22AP of the front cap 22A during a non-use time. Incidentally, the curve A1 indicates a state in a case where the pen pressure is applied, and the curve A2 indicates a state in a case where the application of the pen pressure is released.

In addition, in FIG. 5, curves B1 and B2 are hysteresis curves of the detection output of the pen pressure of an electronic pen not provided with the gap Gp between the rear end surface of the ring-shaped elastic member 16A and the front end surface 22APx of the protruding portion 22AP of the front cap 22A. That is, the curves B1 and B2 are hysteresis curves of the detection output of the pen pressure in an electronic pen configured such that the rear end surface of the ring-shaped elastic member 16A and the front end surface 22APx of the protruding portion 22AP of the front cap 22A are in contact with each other during a non-use time. Incidentally, the curve B1 indicates a state in a case where the pen pressure is applied, and the curve B2 indicates a state in a case where the application of the pen pressure is released.

First, consideration will be given to the case of the electronic pen 1A configured such that the gap Gp of 0.2 mm is provided between the rear end surface of the ring-shaped elastic member 16A and the front end surface 22APx of the protruding portion 22AP, as illustrated in FIG. 4A. In this case, when the electronic pen 1A is put down and a pen pressure is thereby applied to the core body 4, the core body 4 is immediately pushed in to the rear end side of the electronic pen 1A by the amount of the gap Gp. Hence, at substantially the same time as the application of the pen pressure, the pressure sensing parts 7 are pressed, and the detection output (load (g)) of the pen pressure is started. Thus, as indicated by the curve A1 in the vicinity of a pressure level of 0 (zero) in FIG. 5, the curve rises sharply, and the detection output (load (g)) of the pen pressure is obtained swiftly. Thereafter, the ring-shaped elastic member 16A is pressed and deformed according to the pen pressure applied to the core body 4, and the core body 4 gradually presses the pressure sensing parts 7 as the ring-shaped elastic member 16A is deformed. Consequently, as indicated by the curve A1, the detection output (load (g)) of the pen pressure is obtained through the pressure sensing parts 7 according to the applied pen pressure.

Thereafter, when the electronic pen 1A is lifted up and the application of the pen pressure is thereby released, the core body 4 is first immediately pushed out to the pen tip side by the amount of the gap Gp due to the action of the coil spring 13 described above. In this case, as indicated by the curve A2 in FIG. 5, the detection output (load (g)) of the pen pressure detected through the pressure sensing parts 7 changes to decrease. Thereafter, the ring-shaped elastic member 16A deformed according to the applied pen pressure gradually returns to the original state, and a force pressing the pressure sensing parts 7 is correspondingly released. Thus, as indicated by the curve A2, the detection output (load (g)) of the pen pressure detected through the pressure sensing parts 7 converges to 0 (zero) g or a vicinity thereof without delay. That is, the presence of the gap Gp realizes a role of accommodating the hysteresis caused by the properties of the ring-shaped elastic member 16A.

In addition, as illustrated in FIG. 4A, the rib portions of the ring-shaped elastic member 16A have a substantially triangular section. In this case, supposing that the surface including the side S2 is a bottom surface, this bottom surface is fixed to the shaft portion St of the core body 4, and a vertex portion opposed to the bottom surface is in contact with the inner wall surface of the opening portion AH of the front cap 22A. This contact portion is considered to be fixed by friction. The entry of water is thereby prevented, as also described above. In addition, in the case where the core body 4 slidingly moves by the amount of the gap Gp, since the vertex part is in contact with the inner wall surface of the front cap 22A, the side S2 in contact with the shaft portion St of the core body 4 in the moving part does not cause a large frictional force, and the core body 4 can relatively easily be pushed in and pushed back in the axial direction, which contributes to a proper detection of the pen pressure.

Next, consideration will be given to the electronic pen in the case where the electronic pen is configured such that the gap Gp is not provided between the rear end surface of the ring-shaped elastic member 16A and the front end surface 22APx of the protruding portion 22AP. In this case, when the electronic pen is put down and a pen pressure is thereby applied to the core body 4, the ring-shaped elastic member 16A is first pressed and deformed due to the absence of the gap Gp. When the deformation of the ring-shaped elastic member 16A progresses to a certain degree, the core body 4 is pushed in to press the pressure sensing parts 7, so that the pen pressure is detected. As indicated by the curve B1 in the vicinity of a level pressure of 0 (zero) in FIG. 5, the core body 4 does not press the pressure sensing parts 7 unless the deformation of the ring-shaped elastic member 16A progresses to a certain degree. Hence, a time lag occurs between the application of the pen pressure and obtainment of the detection output (load (g)) of the pen pressure. Thereafter, as indicated by the curve B1, the detection output (load (g)) corresponding to the pen pressure applied to the core body 4 is obtained.

In addition, when the electronic pen is lifted up and the application of the pen pressure is thereby released, the pen pressure (load (g)) detected through the pressure sensing parts 7 changes to decrease, as indicated by the curve B2. Thereafter, the ring-shaped elastic member 16A deformed according to the applied pen pressure gradually returns to the original state, the core body 4 is correspondingly pushed back, and the force with which the core body 4 presses the pressure sensing parts 7 is released. However, even when the application of the pen pressure is completely released (even when the applied pen pressure becomes 0 (zero)), the shape of the ring-shaped elastic member 16A is not restored immediately, and returns gradually. Hence, as indicated by the curve B2, even when the level of the applied pen pressure becomes 0 (zero), the detection output (load (g)) of the pen pressure detected through the pressure sensing parts 7 does not become 0 (zero) g for a while, and is maintained at approximately 13.8 g, for example.

Thus, a length of time taken for the detection output (load (g)) of the pen pressure to converge to 0 (zero) after the applied pen pressure becomes 0 (zero) is longer than that in the case where the gap Gp is present. What is generally called the "ink leakage phenomenon" in the electronic pen is hence considered to occur easily. Accordingly, in the electronic pen 1A according to the second embodiment, as described with reference to FIG. 4A, the gap Gp is provided between the rear end surface of the ring-shaped elastic member 16A and the front end surface 22APx of the protruding portion 22AP of the front cap 22A during a non-use time. What is generally called the "ink leakage phenomenon" in the electronic pen consequently does not occur easily. In addition, the presence of the gap Gp enables the pen pressure applied to the core body 4 to be transmitted to the pen pressure detecting unit 7 immediately. Thus, a pen that is more responsive to the pen pressure than a pen without the gap Gp is provided.

As is understood from the above description, also in the case of the electronic pen 1A according to the present second embodiment, the ring-shaped elastic member 16A is provided between the rear end surface Ptx of the pen tip portion Pt of the core body 4 and the front end surface 22APx of the protruding portion 22AP. Consequently, the occurrence of a void (gap) between the core body 4 and the inner wall surface of the front cap 22A at the pen tip portion is prevented, and the entry of water from the pen tip part can thereby be prevented.

In addition, as illustrated in FIG. 4C, the ring-shaped elastic member 16A is provided with the rib portions r1, r2, r3, and r4. Thus, even when a pen pressure higher than is necessary is applied, the ring-shaped elastic member 16A is not reflexed (turned back), so that a decrease in a waterproof function or a decrease in the accuracy of detection of the pen pressure does not occur. Further, the gap Gp is provided between the rear end surface of the ring-shaped elastic member 16A and the front end surface 22APx of the protruding portion 22AP. What is generally called the "ink leakage phenomenon" in the electronic pen consequently does not occur.

Effects of Embodiments

In the case of the electronic pen 1 or 1A according to the first or second embodiment described above, the entry of water such as, for example, saliva from the gap between the core body 4 and the case 2 at the front end part of the electronic pen can be prevented effectively without the configuration of the electronic pen becoming complex and without the functions of the electronic pen being degraded. It is therefore possible to realize an electronic pen suitable for use by an infant or a pupil, who often has a habit of biting, mouthing, or licking the pen tip. The electronic pen is an electronic pen suitable for use in the vicinity of what is generally called a waterside such as a pool, a river, a lake, or a seaside, and is an electronic pen capable of being used outdoors on a rainy day, for example.

Modifications

Material of Ring-Shaped Elastic Members 16 and 16*a*

In the embodiments described above, description has been made supposing that silicon rubber with a hardness of A30 is used for the ring-shaped elastic members 16 and 16A. However, there is no limitation to this. The ring-shaped elastic members 16 and 16A may be formed with use of various elastic materials with a desired hardness. Hence, the ring-shaped elastic members 16 and 16A can be formed with use of various elastic resin materials including, for example, natural rubber and a sponge. In addition, the ring-shaped elastic members 16 and 16A can be fixed at a predetermined position of the core body 4 with use of an adhesive as necessary.

Modifications of Rib Portions of Ring-Shaped Elastic Member 16*a*

In addition, the number of rib portions of the ring-shaped elastic member 16A is not limited to four. The ring-shaped elastic member can be, for example, provided with three rib portions at intervals of 120 degrees, provided with two rib portions at intervals of 180 degrees, or provided with eight rib portions at intervals of 45 degrees along the circumference of the ring-shaped elastic member. The ring-shaped elastic member can thus be provided with an appropriate number of rib portions at various intervals. Hence, the size of the rib portions can be set to be an appropriate size according to the number of the rib portions provided. In addition, the intervals between the rib portions do not necessarily need to be equal intervals.

In addition, the rib portions of the ring-shaped elastic member 16A do not need to be provided at intervals along the circumference of the ring-shaped elastic member, and may be provided continuously in such a manner as to encircle the ring-shaped elastic member. In addition, the shape of the rib portions is not limited to a shape whose section is substantially triangular. The section may be circular, for example. In short, it is possible to provide rib portions of various sectional shapes having a part in contact with the shaft portion St of the core body 4 and a part in contact with the inner wall surface of the opening portion H or AH of the front cap 22 or 22A. Further, it is possible to provide rib portions of various sectional shapes having a part that is to be in contact with the front end surface 22Px or 22APx of the protruding portion 22P or 22AP of the front cap 22 or 22A.

Application to Electronic Pens of Various Types

In the embodiments described above, description has been made by taking as an example a case where the electronic pen 1 is of the active capacitive type. However, the electronic pen is not limited to the active capacitive type. For example, the present disclosure can be applied also to an electronic pen of an electromagnetic induction type including a resonance circuit constituted by an inductor (coil) and a capacitor. In short, the present disclosure can be applied to such an electronic pen that water may enter due to a gap formed between the core body and the case (casing) on the pen tip side of the electronic pen.

It is to be noted that the embodiment of the present disclosure is not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:

a casing that is a tubular body having an opening portion at a front end, has a ring-shaped protruding portion protruding toward an axis from an inner wall surface in a vicinity of the opening portion, and is mounted with a circuit part;

a core body that is a rod-shaped body including a pen tip portion and a shaft portion extending from a rear end surface of the pen tip portion, the pen tip portion and the shaft portion having a same central axis, and an area of the rear end surface of the pen tip portion being larger than an area of a front end surface of the shaft portion; and a ring-shaped elastic member that is a ring-shaped member so provided as to be penetrated by the shaft portion in a part in which a front end surface of the protruding portion of the casing and the rear end surface of the pen tip portion of the core body are opposed to each other when the core body is inserted through the opening portion of the casing from a rear end side and a rear end portion of the core body is attached to an inside of the casing, the ring-shaped elastic member having an inclined side surface by having a small opening on a pen tip side and having a large opening on a rear end side.

2. The electronic pen according to claim 1, wherein a rib portion is formed on an inner wall surface of the ring-shaped elastic member, the rib portion protruding inward and having a part in contact with a side surface of the shaft portion of the core body and a part in contact with the front end surface of the protruding portion of the casing.

3. The electronic pen according to claim 1, wherein a rib portion is formed on an inner wall surface of the ring-shaped elastic member, the rib portion protruding inward in a ring shape along an inner circumference and having a part in contact with a side surface of the shaft portion of the core body and a part in contact with the front end surface of the protruding portion of the casing.

4. The electronic pen according to claim 1, wherein a plurality of rib portions are formed on an inner wall surface of the ring-shaped elastic member, the plurality of rib portions being a plurality of parts protruding inward at intervals along an inner circumference and each having a part in contact with a side surface of the shaft portion of the core body and a part in contact with the front end surface of the protruding portion of the casing.

5. The electronic pen according to claim 1, wherein a plurality of rib portions are formed on an inner wall surface of the ring-shaped elastic member, the plurality of rib portions being a plurality of parts protruding inward at intervals along an inner circumference and each having a part in contact with a side surface of the shaft portion of the core body and a part in contact with the front end surface of the protruding portion of the casing, and a void is present between a corresponding one of the rib portions and the front end surface of the protruding portion of the casing in a state in which no pen pressure is applied to the core body.

6. The electronic pen according to claim 1, wherein a plurality of rib portions are formed on an inner wall surface of the ring-shaped elastic member, the plurality of rib portions being a plurality of parts protruding inward at intervals along an inner circumference and each having a first surface in contact with a side surface of the shaft portion of the core body and a second surface in contact with the front end surface of the protruding portion of the casing, and a part surrounded by the first surface, the second surface, and the side surface of the ring-shaped elastic member forming a substantially triangular section when sectioned in an axial direction.

7. The electronic pen according to claim 1, wherein a plurality of rib portions are formed on an inner wall surface of the ring-shaped elastic member, the plurality of rib portions being a plurality of parts protruding inward at intervals along an inner circumference and each having a first surface in contact with a side surface of the shaft portion of the core body and a second surface in contact with the front end surface of the protruding portion of the casing, and a part surrounded by the first surface, the second surface, and the side surface of the ring-shaped elastic member forming a substantially triangular section when sectioned in an axial direction, and a void is present between the second surface of each of the rib portions and the front end surface of the protruding portion of the casing in a state in which no pen pressure is applied to the core body.

8. The electronic pen according to claim 1, wherein the ring-shaped elastic member is silicon rubber.

* * * * *